United States Patent [19]

Stemme et al.

[11] 4,285,455

[45] Aug. 25, 1981

[54] MECHANICAL FILM DRIVE FOR DRIVING MOTION PICTURE FILM, PARTICULARLY IN PROJECTION AND SCANNING SYSTEMS

[75] Inventors: Otto Stemme, Munich; Eduard Wagensonner, Aschheim; Wolfgang Ruf, Munich, all of Fed. Rep. of Germany

[73] Assignee: AGFA-Gevaert Aktiengesellschaft, Leverkusen, Fed. Rep. of Germany

[21] Appl. No.: 162,106

[22] Filed: Jun. 23, 1980

Related U.S. Application Data

[63] Continuation-in-part of Ser. No. 136,114, Mar. 31, 1980.

[30] Foreign Application Priority Data

Jul. 7, 1979 [DE] Fed. Rep. of Germany ....... 2927541

[51] Int. Cl.³ .......................................... B65H 17/22
[52] U.S. Cl. .................................... 226/188; 226/194
[58] Field of Search .............................. 226/186–188, 226/194, 50, 61; 242/200–203; 271/2, 3

[56] References Cited

U.S. PATENT DOCUMENTS

| | | | |
|---|---|---|---|
| 1,892,554 | 12/1932 | Kellogg | 226/61 |
| 3,602,415 | 8/1971 | Gross | 226/188 |
| 3,612,375 | 10/1971 | Baba | 226/188 |
| 3,800,993 | 4/1974 | Stephens | 226/187 |
| 3,976,236 | 8/1976 | Catto | 226/50 |

Primary Examiner—Leonard D. Christian
Attorney, Agent, or Firm—Michael J. Striker

[57] ABSTRACT

A mechanical film drive utilizes a rotatable drive shaft which abuts a flat surface of motion picture film to be driven. The film is pinched between the drive shaft and a rubber idler roller, and the drive shaft can be coupled to and uncoupled from a speed-regulated drive motor by means of an electrically-operable clutch. A flywheel is driven by the motor. Since the inertia of the flywheel is much greater than the inertia of the drive shaft, clutch operation has only a negligible effect on drive speed, enabling film movement to be accomplished with a high degree of accuracy.

8 Claims, 2 Drawing Figures

MECHANICAL FILM DRIVE FOR DRIVING MOTION PICTURE FILM, PARTICULARLY IN PROJECTION AND SCANNING SYSTEMS

CROSS-REFERENCE TO RELATED APPLICATIONS

This application is a continuation-in-part application of another application filed Mar. 31, 1980, and bearing Ser. No. 136,114. The entire disclosure of this latter application, including the drawings thereof, is hereby incorporated in this application as if fully set forth herein.

BACKGROUND OF THE INVENTION

In application Ser. No. 136,114, filed Mar. 31, 1980, a projection and scanning system is disclosed which can be used to produce a flickerless television signal from motion picture film. As is set forth therein, it is desirable to provide a system which will not only drive the film in a continuous mode, but will also drive the film in a discrete mode so as to enable an individual frame on the motion picture film to be displayed.

As is further set forth in the above-mentioned application, either two motors or one motor may be used to drive the film. In the preferred embodiment taught in the above-mentioned application, two motors are utilized, with one motor driving the film in a continuous mode and the other motor driving the film in a discrete mode so as to enable individual frames of the motion picture film to be scanned.

In order to reduce manufacturing expense, it would be desirable to provide a mechanical film drive which could be used with projection and scanning systems of this type that would allow motion picture film to be driven either continuously or discretely as required, but which would utilize only one drive motor.

As will appear evident from the above-mentioned specification, proper positioning of the motion picture film is an essential task of such a mechanical film drive. Thus, in addition to the requirement that such a film drive utilize only one motor, it would be desirable to provide a mechanical film drive of this type which would enable film registration in a projection gate to be precisely controlled in accordance with vertical synchronization pulses that are used in conventional video signals.

SUMMARY OF THE INVENTION

These objects, along with others which will appear hereinafter, are achieved in this invention by the use of an electrically-operable clutch which is interposed between the drive motor and the mechanical element which drives the film. By energizing and deenergizing the clutch, film drive can be halted without the use of brakes on the drive motor and without interrupting rotation thereof.

Furthermore, the mechanical element which actually drives the film is so constructed and arranged that it has very little inertia. Thus, when the clutch disconnects this element from the drive motor, the film stops moving immediately and residual error in film registration is negligible.

Advantageously, the film drive may utilize a flywheel which is driven by the drive motor, and which is coupled to and uncoupled from the drive element by the clutch. By utilizing such a flywheel, no appreciable drive speed reduction results from energizing the clutch and driving the film.

Finally, the drive element used herein is not toothed or sprocketed, and does not drive the film by mechanical engagement therewith. Rather, in this invention the film is driven by a rotatable drive shaft which is pressed against a surface of the film and which pinches the film against an idler roller which is spring-loaded so as to ensure a slip-free connection between the drive shaft and the film.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF PREFERRED EMBODIMENTS

Figure 1:
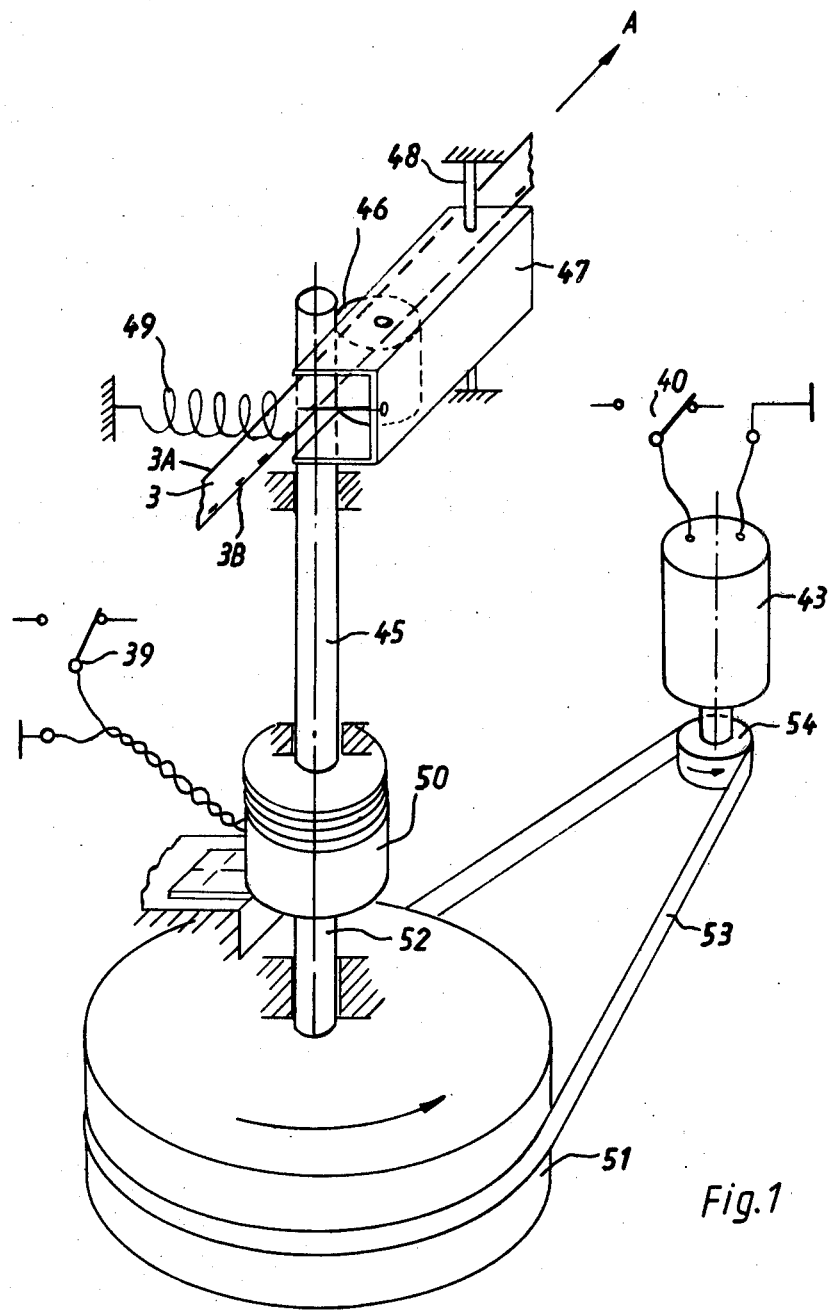
FIG. 1 is a perspective view of the invention.

A projection and scanning system (not shown) which produces a video signal from motion picture film 3 is so arranged that the film 3 is driven in direction A as is shown in FIG. 1. In order to drive the film, an elongated cylindrical drive shaft 45 is used. The circumferential surface of drive shaft 45 abuts a surface 3A of film 3.

A rubber idler roller 46 abuts surface 3B of film 3, so that film 3 is pinched between drive shaft 45 and idler roller 46. Idler roller 46 is mounted on bracket 47, so as to be free to rotate as film 3 moves. Bracket 47 is U-shaped in cross section, and is pivotally mounted around axle 48 which is parallel to drive shaft 45. A tension spring 49 pulls bracket 47 towards film 3 and drive shaft 45, to cause film 3 to be tightly pinched between drive shaft 45 and idler roller 46 and to thereby ensure a slip-free connection between drive shaft 45 and film 3.

A clutch 50 is secured to that end of drive shaft 45 which is remote from film 3. Clutch 50 is electrically operable, and can either couple drive shaft 45 to the remainder of the apparatus taught herein or uncouple drive shaft 45 therefrom. Thus, by energization and de-energization of clutch 50, drive shaft 45 may be caused to rotate or prevented from rotating, depending upon use requirements described more completely hereinafter. Clutch 50 is of the type KMLX 028 commercially available by Magnet-Schultz GmbH & Co., Memmingen, Federal Republic of Germany.

Flywheel 51 is attached to clutch 50 by shaft 52. Furthermore, belt 53 is wrapped around flywheel 51 and around drive wheel 54. Drive wheel 54 is rotated by motor 43.

It may now be seen that drive motor 43 can be mechanically connected to drive shaft 45 when clutch 50 is energized, and can be disconnected therefrom when clutch 50 is de-energized. Drive shaft 45 is manufactured so as to have a low inertia. Conversely, flywheel 51 is manufactured in such a fashion as to have a relatively high inertia. After drive motor 43 has been energized and flywheel 51 reaches a rotational steady state, the discrepancy between the inertae of drive shaft 45 and flywheel 51 is such that energization and de-energization of clutch 50 has, for practical purposes, no effect upon rotational speed of flywheel 51. Thus, when clutch 50 is energized, film 3 moves instantly at the proper speed, whereas when clutch 50 is de-energized, film 3 immediately ceases its movement. Because of these design features, the mechanical system disclosed in FIG. 1 has a negligible residual error, and allows movement of film 3 to be controlled with an extremely high degree of accuracy.

Figure 2:
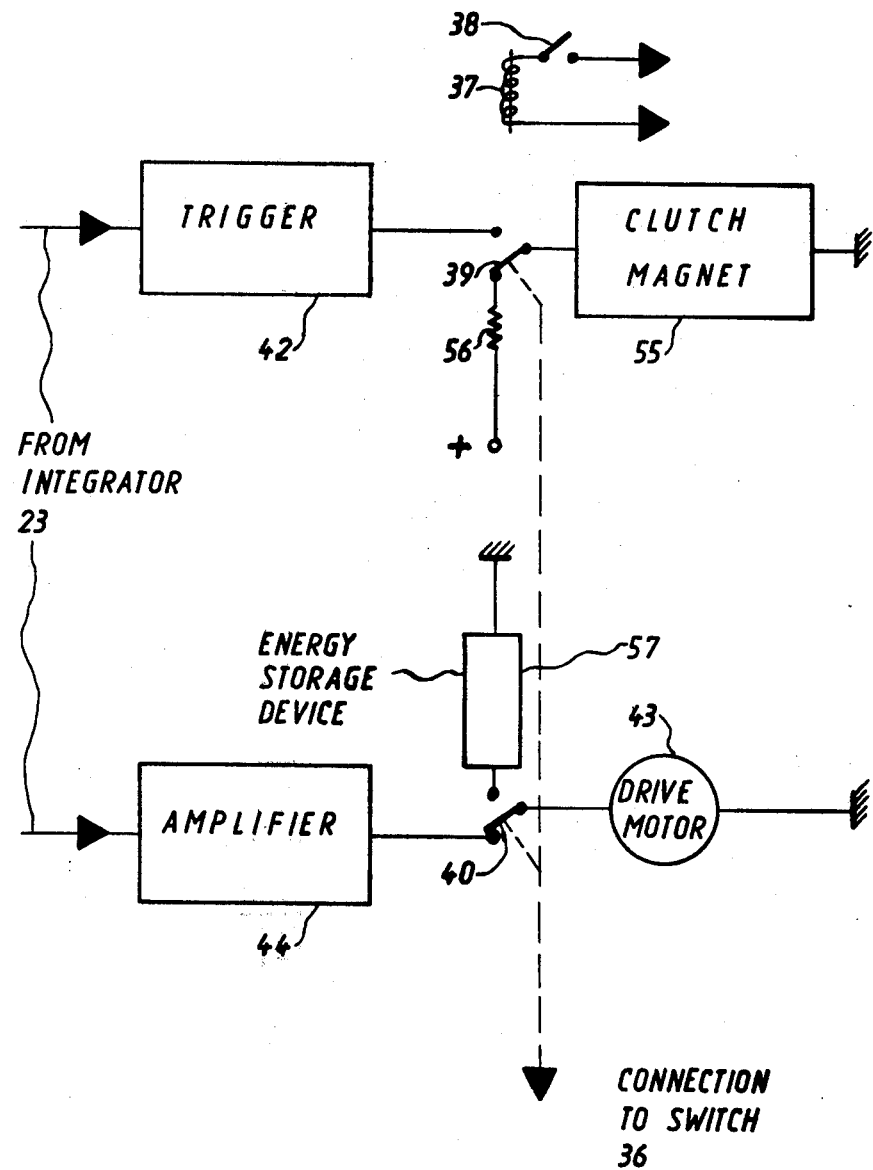
FIG. 2 is a block diagram of a relevant portion of the circuit of a projection and scanning system in which this invention may be used.

FIG. 2 shows some circuitry which can be used to drive the mechanical apparatus depicted in FIG. 1. As is set forth in copending application Ser. No. 136,114, filed Mar. 31, 1980, the drive taught herein is actually driven by a trigger 42 if the projection and scanning system is to drive the film in a discrete mode, while the drive described herein will be driven by amplifier 44 in the event that a continuous drive mode is required. In the abovementioned application, switches 39 and 40 are shown to be single-pole, single-throw switches.

Inasmuch as the invention herein utilizes only one drive motor, namely drive motor 43, both switches 39 and 40 as used herein are single-pole, double-throw switches. However, as before, these switches can be operated by relay 37, which can be energized and de-energized by opening and closure of switch 38. Moreover, switches 39 and 40 are still linked to switch 36 as is disclosed in the abovementioned application.

Each of switches 39 and 40 has a first position (corresponding to a continuous drive mode) and a second position (corresponding to a discrete drive mode). As shown in FIG. 2, both switches 39 and 40 are shown to be in their first positions, so that the film will be driven in the continuous mode. In these positions, magnet 55 of clutch 50 is connected to power by switch 39, through resistor 56. Drive motor 43 is connected to amplifier 44 via switch 40. In this mode, amplifier 44 drives drive motor 43 with a regulated speed, and drive motor 43 is mechanically connected to drive shaft 45 since clutch magnet 55 is energized. Thus, film 3 is driven at a regulated speed by drive motor 43.

However, in the event that film 3 is to be driven in a discrete mode in a stepwise fashion, switches 39 and 40 are moved to their second position; in which clutch magnet 55 is connected to trigger 42 via switch 39 and drive motor 43 is connected to an energy storage device 57 through switch 40. Energy storage device 57 may be any suitable source of electrical energy, such as a battery or another tap off the primary power supply utilized with the rest of the projection and scanning system (not shown). However, it is to be noted that energy storage device 57 is a DC source to energize drive motor 43, which is also DC. When energy storage device 57 is connected to drive motor 43, drive motor 43 is operated at a lower speed than it would be operated were film 3 to be driven in the continuous mode.

In the discrete drive mode, trigger 42 will energize and de-energize clutch magnet 55 in a stepwise fashion, causing successive frames on film 3 to be exactly registered with the projection gate (not shown) of the projection and scanning system (not shown). Inasmuch as drive motor 43 operates with a reduced speed in this discrete mode, and inasmuch as the residual error of the system is negligible as was explained above, the system disclosed herein can position film 3 with a high degree of accuracy. In fact, positioning error of film 3 in the discrete drive mode is negligible.

It will be understood that each of the elements described above, or two or more together, may also find a useful application in other types of constructions differing from the types described above.

While the invention has been illustrated and described as embodied in a mechanical film drive for driving motion picture film, particularly in projection and scanning systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mechanical film drive for driving motion picture film when the drive is connected to a speed-regulated drive motor, comprising:
   a rotatable drive shaft which, when rotated, drives the film;
   a power takeoff attached to the motor and rotated thereby;
   an electrically-operable clutch connected to the drive shaft and the power takeoff, the clutch mechanically coupling and uncoupling the drive shaft and the power takeoff to and from each other; and
   means for energizing and deenergizing the clutch including
   a circuit controlled by the desired film position and the desired projection mode; and
   a switch having a first position and a second position, the switch being connected in a manner that when the switch is in the first position, the clutch will be continuously energized, and when the switch is in the second position, the clutch may be intermittently energized by the circuit.

2. The film drive defined by claim 1, wherein the drive shaft has a low inertia.

3. The film drive defined by claim 2, further including a flywheel forming a part of the power takeoff.

4. The film drive defined by claim 1, wherein the drive shaft is cylindrical and abuts a surface of the film.

5. The film drive defined by claim 4, wherein the film drive further includes an idler roller abutting another surface of the film in a manner that the film is pinched between the drive shaft and the idler roller.

6. The film drive defined by claim 5, wherein the idler roller is of rubber.

7. The film drive defined by claim 1, wherein the clutch couples the drive shaft to the power takeoff when the clutch is energized, and uncouples the drive shaft from the power takeoff when the clutch is de-energized.

8. The film drive defined by claim 5 further comprising
   an axle;
   an arm supporting the idler roller and pivotably mounted on the axle; and
   a spring urging the arm towards the film.

* * * * *